US009166439B2

(12) United States Patent
Low et al.

(10) Patent No.: US 9,166,439 B2
(45) Date of Patent: Oct. 20, 2015

(54) SYSTEMS AND METHODS FOR FORWARD LINK COMMUNICATION IN WIRELESS POWER SYSTEMS (71) Applicant: QUALCOMM Incorporated, San Diego, CA (US)

(72) Inventors: Zhen Ning Low, San Diego, CA (US); Jatupum Jenwatanavet, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 13/669,227

(22) Filed: Nov. 5, 2012

(65) Prior Publication Data
US 2014/0125275 A1    May 8, 2014

(51) Int. Cl.
H02J 7/02      (2006.01)
H04B 5/00      (2006.01)

(52) U.S. Cl.
CPC .............. *H02J 7/025* (2013.01); *H04B 5/0037* (2013.01); *H04B 5/0087* (2013.01); *H04B 5/0093* (2013.01)

(58) Field of Classification Search
CPC ........................................................ H02J 7/025
USPC ....................................................... 320/108
See application file for complete search history.

(56) References Cited

U.S. PATENT DOCUMENTS

| | | | |
|---|---|---|---|
| 5,923,544 A | 7/1999 | Urano | |
| 2010/0109443 A1* | 5/2010 | Cook et al. | 307/104 |
| 2010/0201314 A1* | 8/2010 | Toncich et al. | 320/108 |
| 2010/0259217 A1 | 10/2010 | Baarman et al. | |
| 2010/0277120 A1* | 11/2010 | Cook et al. | 320/108 |
| 2012/0025761 A1 | 2/2012 | Takada et al. | |
| 2012/0050015 A1 | 3/2012 | Low et al. | |
| 2012/0146425 A1 | 6/2012 | Lee et al. | |

* cited by examiner

*Primary Examiner* — Drew A Dunn
*Assistant Examiner* — Jerry D Robbins
(74) *Attorney, Agent, or Firm* — Knobbe Martens Olson & Bear, LLP (57) ABSTRACT This disclosure provides systems, methods and apparatus for forward link communication in wireless power systems. One aspect of the disclosure provides a wireless charging device for providing wireless power to a receiving device. The wireless charging device includes a primary transmit antenna configured to generate a wireless power field. The device further includes a parasitic antenna configured to selectively adjust a coupling between the primary transmit antenna and the receiving device. The device further includes a controller configured to control the selective adjustment of the parasitic antenna so as to communicate with the receiving device.

34 Claims, 8 Drawing Sheets

SYSTEMS AND METHODS FOR FORWARD LINK COMMUNICATION IN WIRELESS POWER SYSTEMS

FIELD

The present invention relates generally to wireless power. More specifically, the disclosure is directed to forward link communication in wireless power systems.

BACKGROUND

An increasing number and variety of electronic devices are powered via rechargeable batteries. Such devices include mobile phones, portable music players, laptop computers, tablet computers, computer peripheral devices, communication a devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

One aspect of the disclosure provides a wireless charging device. The device includes a primary transmit antenna configured to generate a wireless power field. The device further includes a parasitic antenna configured to selectively adjust a coupling between the primary transmit antenna and the receiving device. The device further includes a controller configured to control the selective adjustment of the parasitic antenna so as to communicate with the receiving device.

Another aspect of the subject matter described in the disclosure provides a method of providing wireless power in a wireless charging device. The method includes generating, at a primary transmit antenna, a wireless power field. The method further includes selectively adjusting a coupling between the transmit antenna and the receiving device, via a parasitic antenna. The method further includes communicating with the receiving device by controlling the selective adjustment of the parasitic antenna.

Another aspect of the subject matter described in the disclosure provides an apparatus for providing wireless power. The apparatus includes means for generating a wireless power field. The apparatus further includes means for selectively adjusting a coupling between the means for providing wireless charging power and the receiving device. The apparatus further includes means for communicating with the receiving device by controlling the means for selectively adjusting.

Another aspect of the subject matter described in the disclosure provides a non-transitory computer-readable medium including code that, when executed, causes an apparatus to provide, at a primary transmit antenna, wireless charging power to a receiving device. The medium further includes code that, when executed, causes the apparatus to selectively adjust a coupling between the transmit antenna and the receiving device, via a parasitic antenna. The medium further includes code that, when executed, causes the apparatus to communicate with the receiving device by controlling the selective adjustment of the parasitic antenna.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

Figure 1:
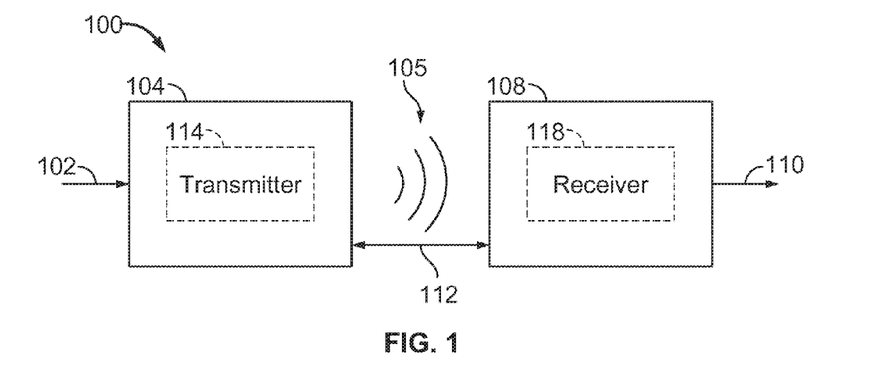
FIG. 1 is a functional block diagram of an exemplary wireless power transfer system, in accordance with exemplary embodiments of the invention.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
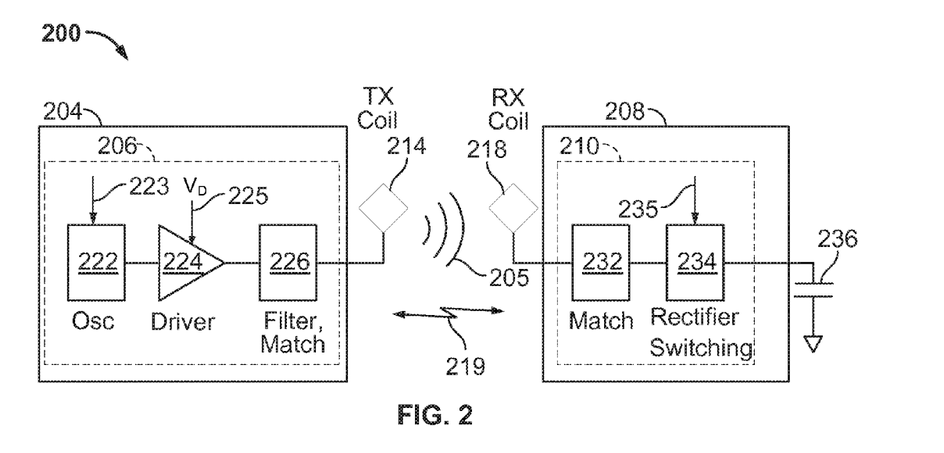
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disableable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication a device, such as a near-field communication (NFC) or radio-frequency identification a device (RFID may be configured to receive power from a wireless power transfer field and communicate by interacting with the wireless power transfer field and/or utilize the received power to communicate with a transmitter 204 or other devices.

Figure 3:
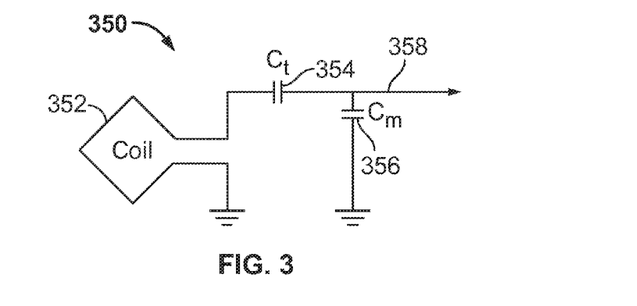
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 354 and capacitor 356 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 352. For transmit coils, the signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 114, energy may be efficiently transferred. The AC signal induced in the receive coil 118 may be rectified as described above to produce a DC signal that may be provided to charge or to power a load.

Figure 4:
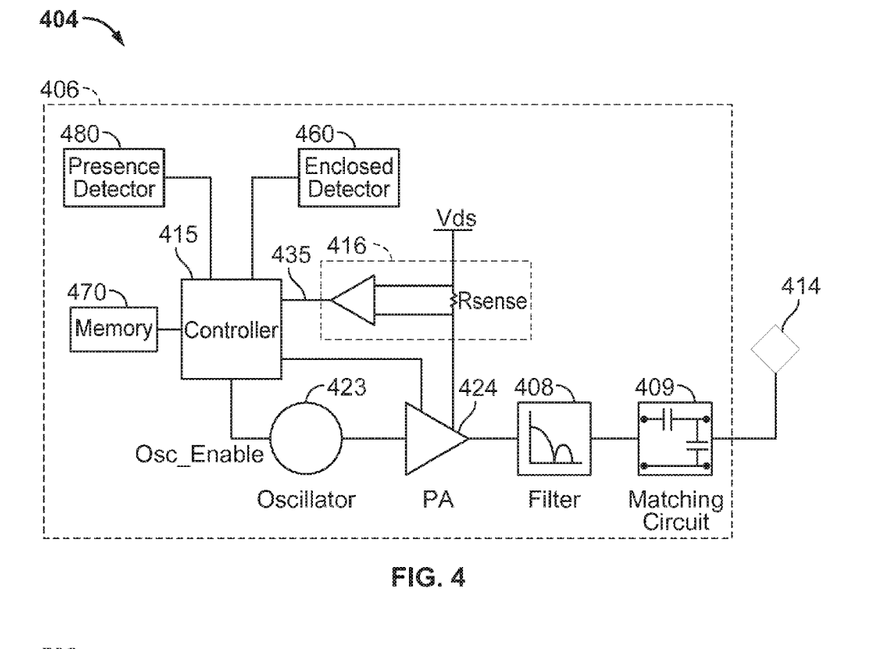
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may include discrete devices or circuits, or alternately, may include an integrated assembly. An exemplary RF power output from transmit coil 414 may be around 1 Watt-10 Watts, such as around 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
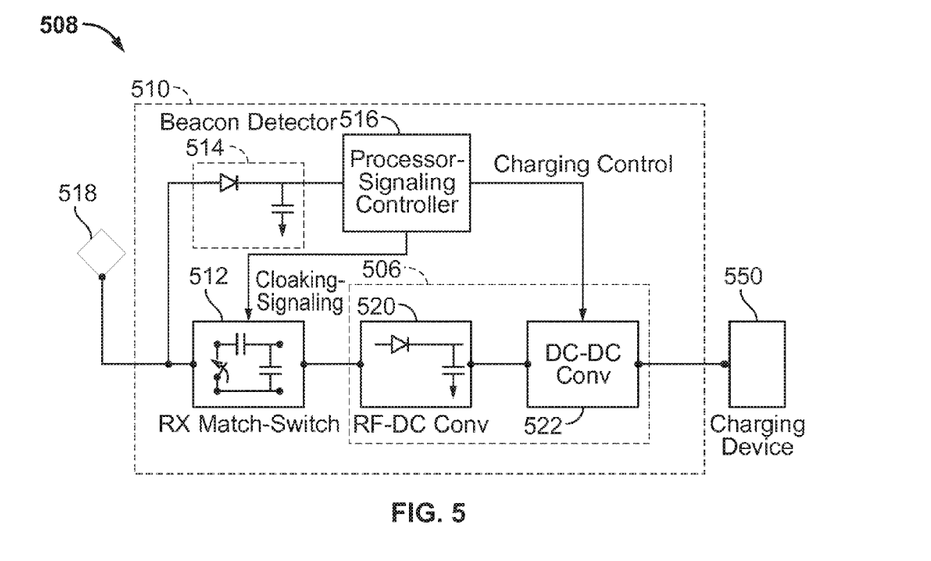
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication a devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller than the diameter or length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 4).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
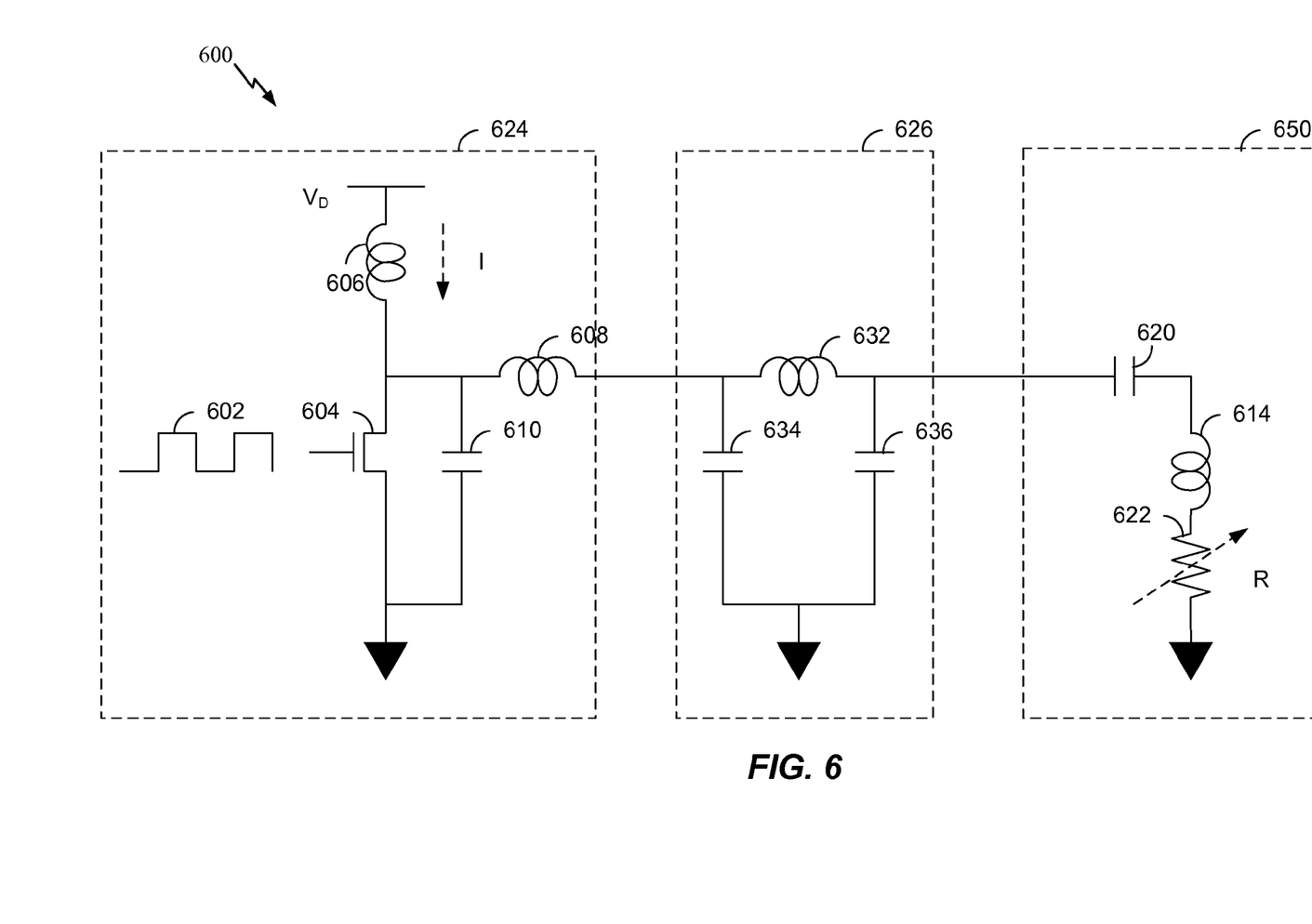
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 including a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

As discussed above with respect to FIG. 2, the receiver 208 and transmitter 204 can communicate via in-band signaling using characteristics of the wireless field 205. As discussed above with respect to FIGS. 4 and 5, the transmitter 404 can signal the receiver 508 via a "forward link". For example, in various embodiments, the transmitter 404 can signal the receiver 508 by selectively enabling the oscillator 423, adjusting the frequency or phase of the oscillator 423, and/or adjusting the output power level via the PA 424. Likewise, the receiver 508 can signal the transmitter 404 via a "reverse link." For example, the receiver 508 can use tuning and de-tuning of the receive coil 518 to adjust how much power is being accepted from the fields. The transmitter 404 may detect this difference in power used from the field and interpret these changes as a message from the receiver 508.

In some embodiments, the aforementioned methods of forward link signaling can have a slow response time. For example, adjusting the power level at the PA 424 (FIG. 4) can include a time-consuming process of adjusting a buck regulator output voltage. Moreover, in implementations including a plurality of transmit coils 414 (FIG. 4) driven by common transmit circuitry 406 (FIG. 4), all transmit coils 414 will be affected by the signaling. Accordingly, the forward link signaling may consume a higher amount of switching power, and the forward link may be established over an indiscriminately wide area.

In some embodiments, the transmitter 404 (FIG. 4) can signal the receiver 508 (FIG. 5) by adjusting the mutual inductance of the transmit coil 414. For example, the transmit coil 414 can include a switchable parasitic coil configured to selectively adjust a tuning of the transmit coil 414. In some embodiments, the controller 415 can switch the parasitic coil faster such that it can adjust a transmit power at the PA 424. In implementations including a plurality of transmit coils 414 (FIG. 4) driven by common transmit circuitry 406 (FIG. 4), each transmit coil 414 can include an independently switched parasitic coil. Accordingly, the transmitter 404 can transmit forward signaling in targeted locations corresponding to each transmit coil 414.

Figure 7A:
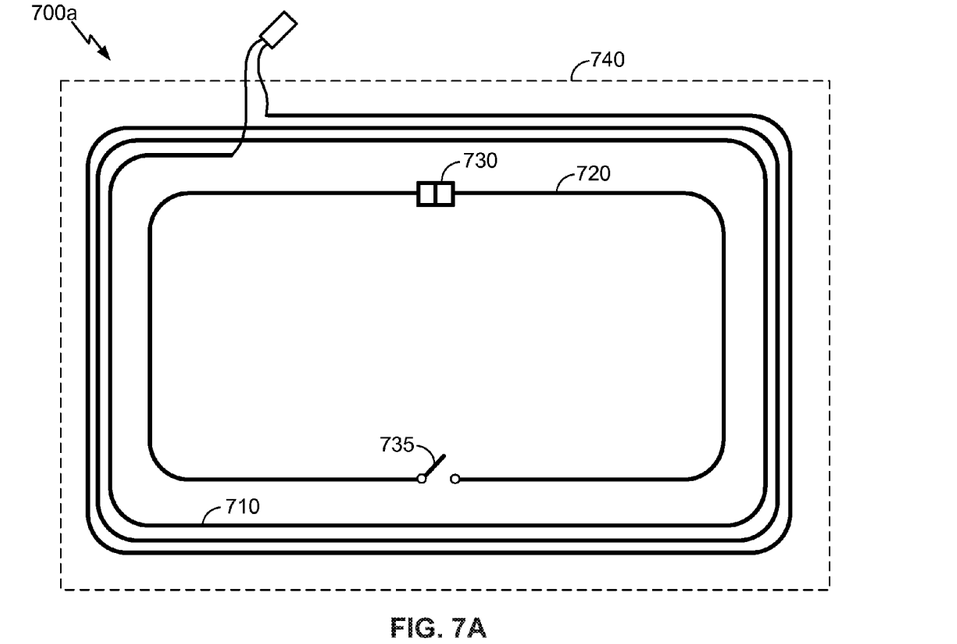
FIG. 7A shows an exemplary transmit coil that may be used in the transmit circuitry of FIGS. 1, 2, 4, and/or 6.

FIG. 7A shows an exemplary transmit coil 700a that may be used in the transmit circuitry of FIGS. 1, 2, 4, and/or 6. The illustrated transmit coil 700a includes a primary coil 710 and a parasitic coil 720. In an embodiment, the transmit coil 700a can be defined in or around a charging surface 740. In various embodiments, the transmit coil 700 can be the transmit coil 214 (FIG. 2), the transmit coil 414 (FIG. 4), and/or the transmit coil 614 (FIG. 6).

The primary coil 710 serves to provide wireless charging power to a receiving device in the vicinity of the charging surface 740. For example, the primary coil 710 can inductively couple with a receive coil such as the receive coil 218 (FIG. 2) or 518 (FIG. 5). An amplifier, such as the driver 224 (FIG. 2), the PA 424 (FIG. 4), and/or the driver 624 (FIG. 6), can power the primary coil 710. In various embodiments, the primary coil 710 can include a single- or multi-turn loop.

In various embodiments, the primary coil 710 can include, be implemented as, or referred to as a primary antenna or loop; an active coil, antenna, or loop; a powered coil, antenna, or loop; and/or a charging coil, antenna, or loop. The transmit coil 700a can include a plurality of primary coils 710, which can be driven by common or independent transmit circuitry (for example, the transmit circuitry 406 of FIG. 4). In some embodiments, the mutual inductance between the primary coil 710 and the receiving device can be adjusted by controlling a magnetic field strength of the primary coil 710.

The parasitic coil 720 serves to adjust a tuning of the primary coil 710. For example, the parasitic coil 720 can adjust a magnetic field strength of the primary coil 710, a mutual inductance between the primary coil 710 and a receiving device, and/or an efficiency of wireless power transfer between the primary coil 710 and a receiving device. The parasitic coil 720 includes at least one reactive network 730 and a switching element 735. In various embodiments, the parasitic coil 720 can include a single- or multi-turn loop.

In various embodiments, the parasitic coil 720 can include, be implemented as, or referred to as a parasitic antenna or loop; a secondary coil, antenna, or loop; a passive coil, antenna or loop; an unpowered coil, antenna, or loop; a tuning coil, antenna, or loop, an auxiliary coil, antenna, or loop; a variable coil, antenna, or loop; a signaling coil, antenna, or loop, and/or a tuning coil, antenna or loop. In some embodiments, the parasitic coil 720 can be galvanically isolated (such as from the transmit circuitry 406), whereas the primary coil 710 may not be galvanically isolated.

The reactive network 730 serves to tune the parasitic loop 720 to modify (for example, increase or decrease) the magnetic field of the primary coil 710 with proper reactance to the transmitter circuit 406 (FIG. 4). For example, the reactive network 730 can be adjusted for a reactance within a target range of reactance of the transmitter coil 710 for the transmitter circuit 406 (FIG. 4). Accordingly, the reactive network 730 can modify a coupling or mutual inductance between the primary coil 710 and a receiving device. In various embodiments, the reactive network 730 can include a network or active and/or passive reactive elements. For example, the reactive network 730 can include one or more resistors, capacitors, and/or inductors, one or more of which can be variable. The reactive network 730 can be controlled by, for example, the controller 415 (FIG. 4). In one embodiment, the reactive network 730 can include a single series capacitor.

The switching element 735 serves to selectively enable and disable the parasitic loop 720. For example, the switching element 735 can "open" or "close" the parasitic loop 720. In various embodiments, the switching element 735 can include one or more of a series switch, a transistor, a varistor, etc. In some embodiments, the switching element 735 can partially close the parasitic loop 720. The switching element 735 can be controlled by, for example, the controller 415 (FIG. 4).

The parasitic coil 720, in conjunction with the properly tuned reactive network 730, can increase or decrease the magnetic field of the primary coil 710 when the switching network 735 is closed. When the switching element 735 is open, the parasitic coil 720 may not modify the magnetic field of the primary coil 710. In some embodiments, a receiving device (for example, the receiver 508 of FIG. 5) can detect changes in the magnetic field, for example by detecting a change in the coupling between the receiving device and the primary coil 710. The controller 415 (FIG. 4) can control the switching element 735 in a pattern, which the receiving device can interpret as data. For example, the processor-signaling controller 516 (FIG. 5) can be configured to detect and decode the switching pattern.

In various embodiments, the transmit coil 700a can include a plurality of parasitic coils 720, which can be controlled by common or independent communication circuitry (for example, the controller 415 of FIG. 4). In various embodiments, the parasitic coil 720 can be arranged with respect to the primary coil 720 in any number of configurations as described below with respect to FIGS. 7B-7F. Although various configurations are described herein, a person having ordinary skill in the art will appreciate that additional configurations are possible within the scope of this disclosure.

Figure 7B:
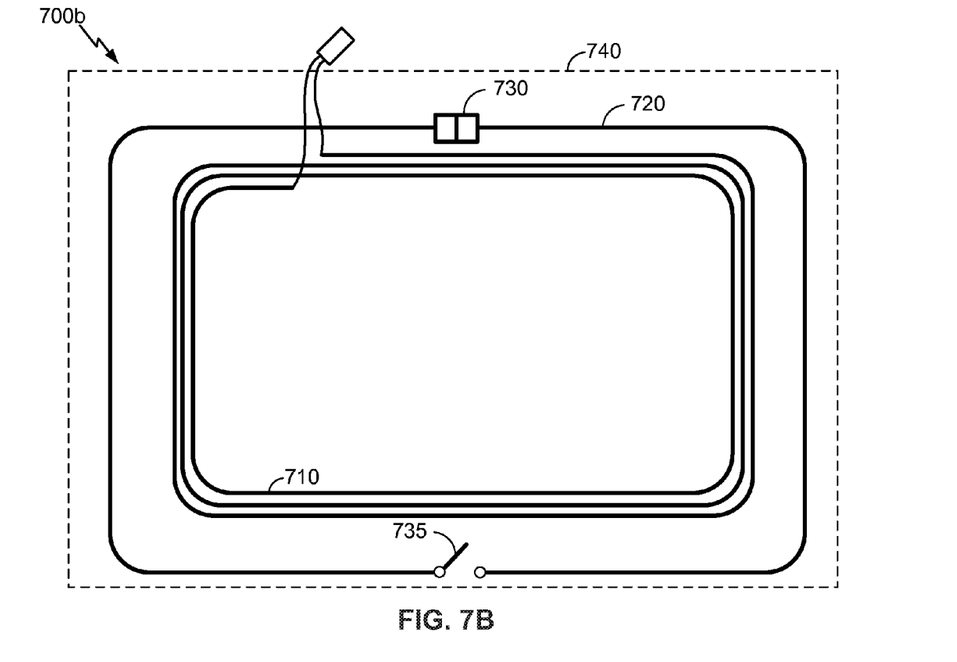
FIG. 7B shows another exemplary transmit coil that may be used in the transmit circuitry of FIGS. 1, 2, 4, and/or 6.

FIG. 7B shows another exemplary transmit coil 700a that may be used in the transmit circuitry of FIGS. 1, 2, 4, and/or 6. In the illustrated transmit coil 700b, the parasitic coil 720 circumscribes the primary coil 710, in contrast to the transmit coil 700a (FIG. 7A), in which the primary coil 710 circumscribes the parasitic coil 720. Accordingly, the parasitic coil 720 can have a larger area than the primary coil 710, in contrast to the transmit coil 700a, in which the primary coil 710 has a larger area than the parasitic coil 720.

Figure 7C:
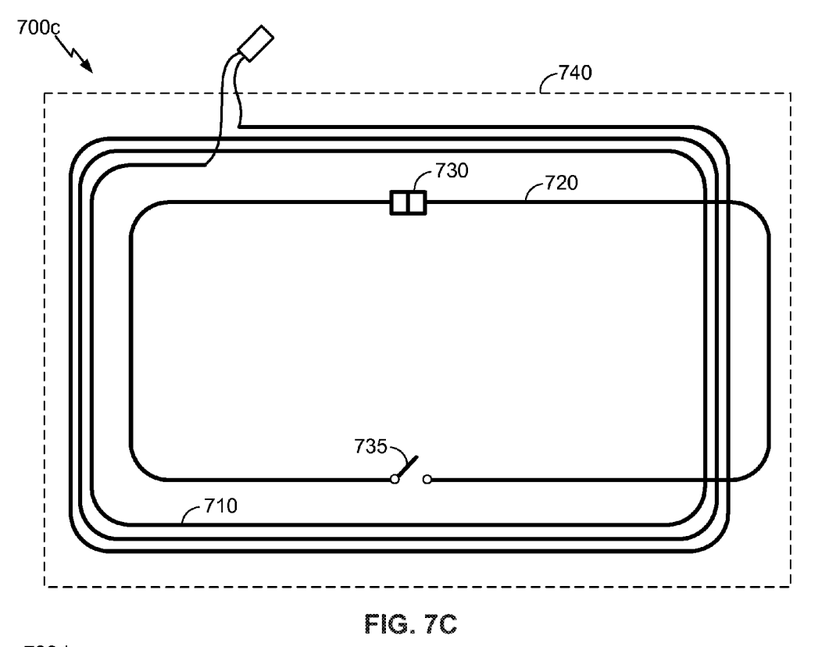
FIG. 7C shows another exemplary transmit coil that may be used in the transmit circuitry of FIGS. 1, 2, 4, and/or 6.

FIG. 7C shows another exemplary transmit coil 700c that may be used in the transmit circuitry of FIGS. 1, 2, 4, and/or 6. In the illustrated transmit coil 700c, the parasitic coil 720 overlaps the primary coil 710, in contrast to the transmit coil 700a (FIG. 7A), in which the parasitic coil 720 does not overlap the primary coil 710. In the illustrated embodiment, the parasitic coil 720 has a smaller area than the primary coil 710.

Figure 7D:
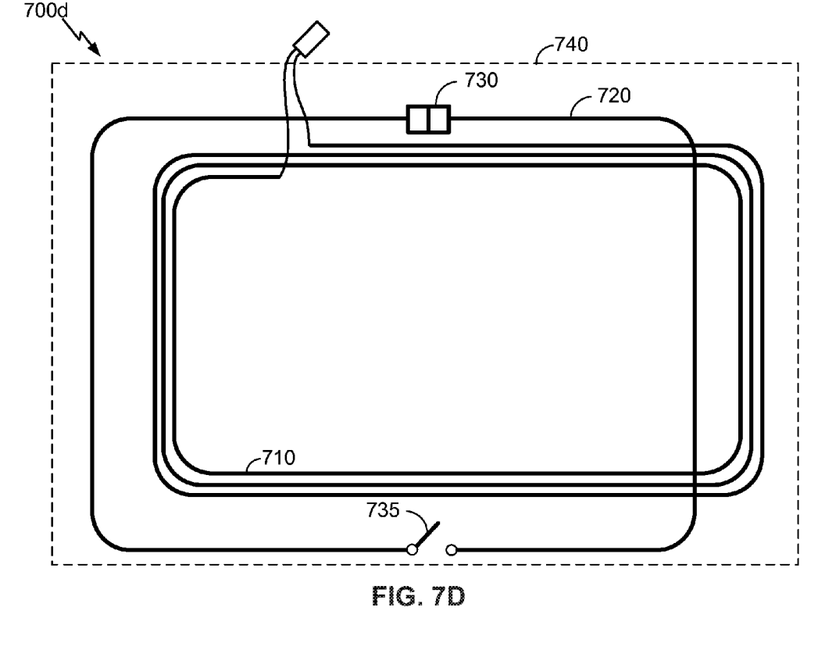
FIG. 7D shows another exemplary transmit coil that may be used in the transmit circuitry of FIGS. 1, 2, 4, and/or 6.

FIG. 7D shows another exemplary transmit coil 700d that may be used in the transmit circuitry of FIGS. 1, 2, 4, and/or 6. In the illustrated transmit coil 700d, the parasitic coil 720 overlaps the primary coil 710, in contrast to the transmit coil 700a (FIG. 7A), in which the parasitic coil 720 does not overlap the primary coil 710. In the illustrated embodiment, parasitic coil 720 has a larger area than the primary coil 710, in contrast to the transmit coil 700a, in which the primary coil 710 has a larger area than the parasitic coil 720.

Figure 7E:
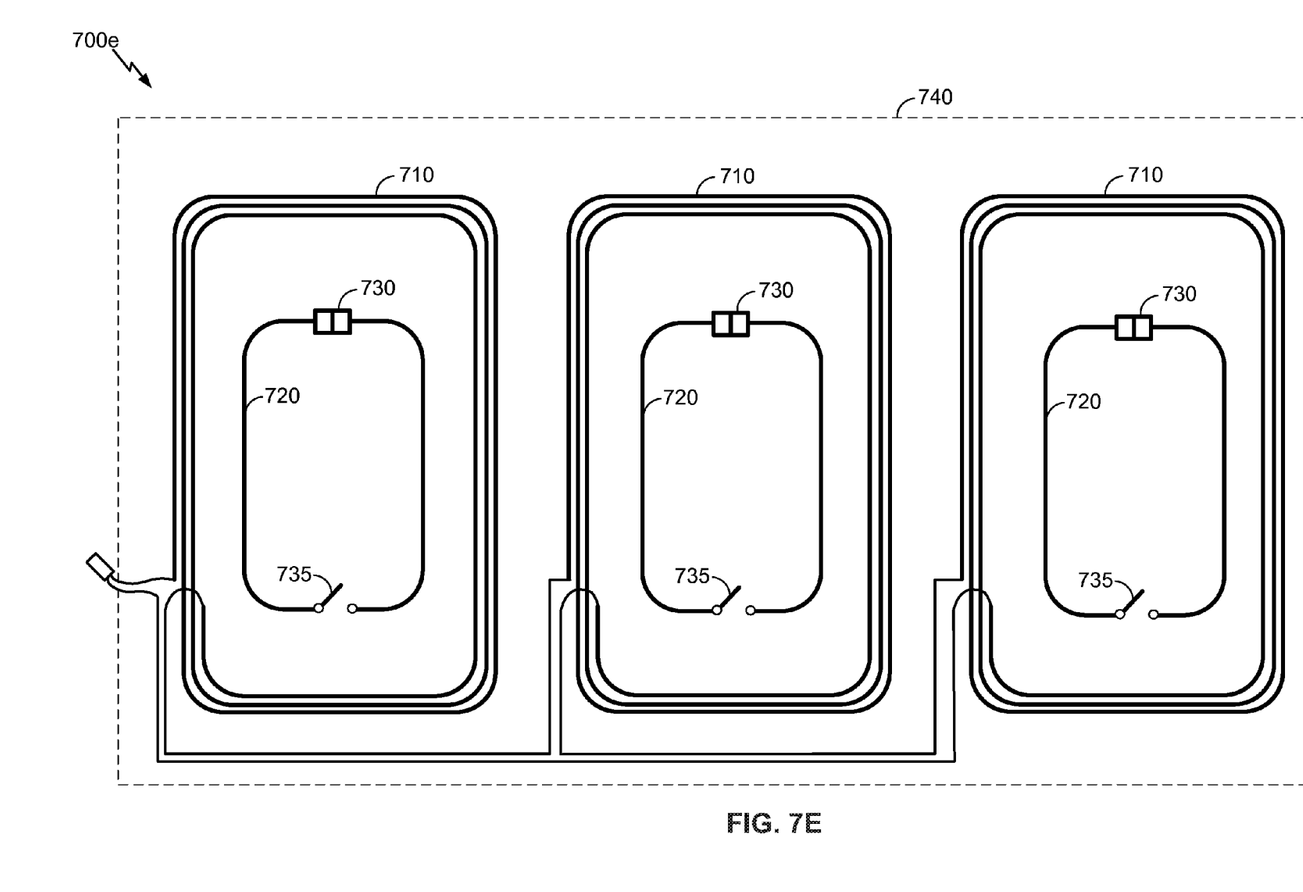
FIG. 7E shows another exemplary transmit coil that may be used in the transmit circuitry of FIGS. 1, 2, 4, and/or 6.

FIG. 7E shows another exemplary transmit coil 700e that may be used in the transmit circuitry of FIGS. 1, 2, 4, and/or 6. In the illustrated embodiment, the transmit coil 700e includes a plurality of primary coils 710, which are commonly driven in series. In various other embodiments, one or more primary coils 710 can be independently driven, or can be driven in parallel. The plurality of primary coils 710 can each provide wireless charging power to a separate receiver, or two or more primary coils 710 can provide wireless charging power to the same receiver in concert. Although three primary coils 710 are shown in FIG. 7E, a person having ordinary skill in the art will appreciate that any number of primary coils 710 can be used. Moreover, in some embodiments, adjacent primary coils 710 can be arranged in a reverse direction.

In the illustrated embodiment, the transmit coil 700e includes a plurality of parasitic coils 720, which are independently controlled. For example, each switching element 735 can be independently controlled by the controller 415 (FIG. 4). In other embodiments, one or more switching elements 735 can be commonly controlled. The plurality of parasitic coils 720 can each provide forward link signaling to a separate receiver, or two or more parasitic coils 720 can provide forward link signaling to the same receiver in concert. Although three parasitic coils 720 are shown in FIG. 7E, a person having ordinary skill in the art will appreciate that any number of parasitic coils 720 can be used, and the number of parasitic coils 720 can be different from the number of primary coils 710.

As shown, the primary coils 710 circumscribe the parasitic coils 720. Moreover, the primary coils 710 have an area greater than the parasitic coils 720, and the primary coils 710 do not overlap the parasitic coils 720. In various embodiments, the parasitic coils 720 can circumscribe the primary coils 710, the parasitic coils 720 can have an area greater than the primary coils 710, and the primary coils 710 can overlap the parasitic coils 720 in various combinations.

Figure 7F:
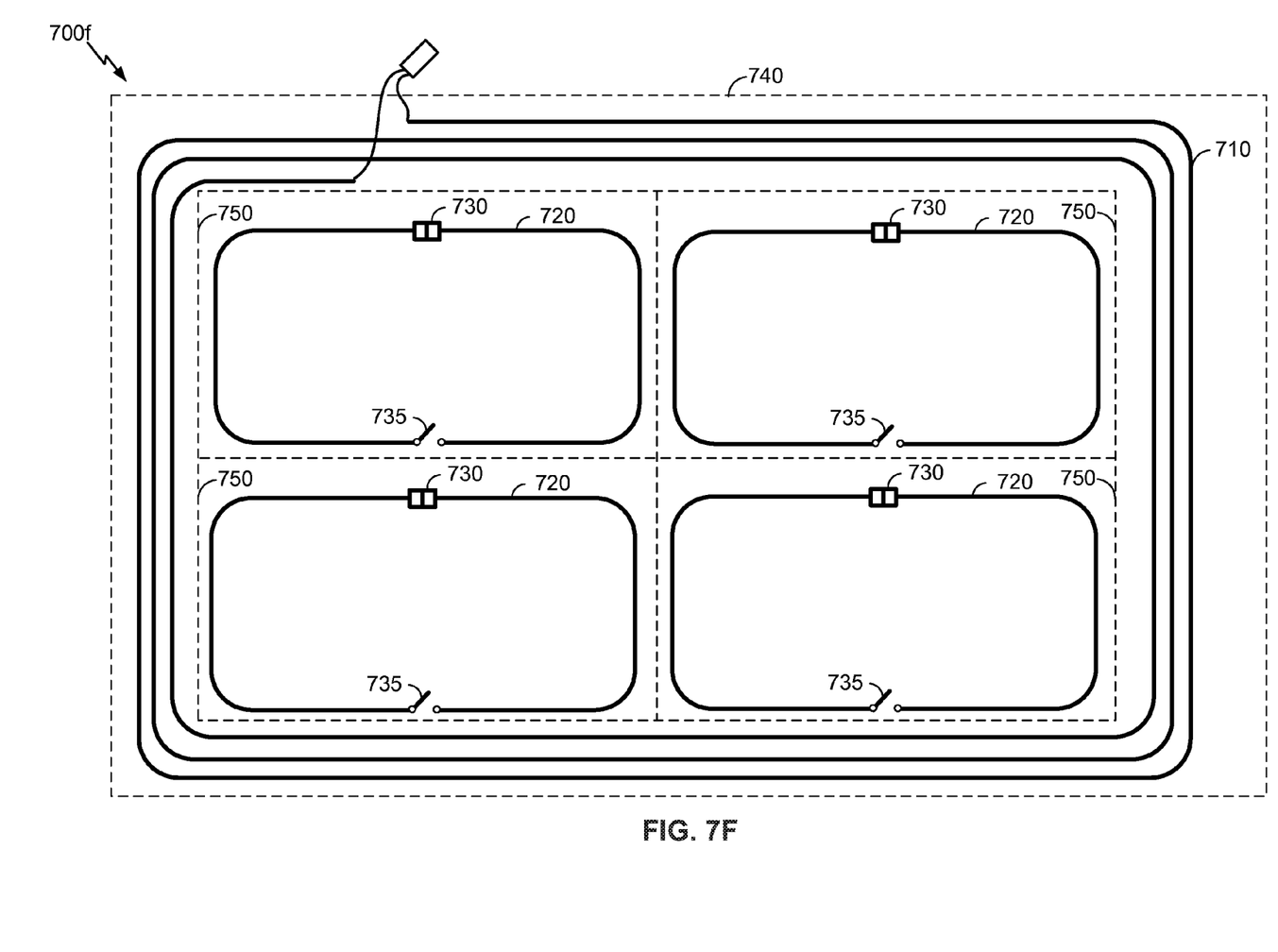
FIG. 7F shows another exemplary transmit coil that may be used in the transmit circuitry of FIGS. 1, 2, 4, and/or 6.

FIG. 7F shows another exemplary transmit coil 700f that may be used in the transmit circuitry of FIGS. 1, 2, 4, and/or 6. In the illustrated embodiment, the transmit coil 700f includes a single primary coil 710. The primary coil 710 can provide wireless charging power to one or more receivers, which can be placed in one or more charging areas 750 of the charging surface 740. In some embodiments, each parasitic coil 720 can correspond to a separate charging area 750.

In the illustrated embodiment, the transmit coil 700f includes a plurality of parasitic coils 720, which are independently controlled. For example, each switching element 735 can be independently controlled by the controller 415 (FIG. 4). In other embodiments, one or more switching elements 735 can be commonly controlled. The plurality of parasitic coils 720 can each provide forward link signaling to a separate receiver, or two or more parasitic coils 720 can provide forward link signaling to the same receiver in concert. Although four parasitic coils 720 are shown in FIG. 7F, a person having ordinary skill in the art will appreciate that any number of parasitic coils 720 can be used.

As shown, the primary coils 710 circumscribe the parasitic coils 720. Moreover, the primary coils 710 have an area greater than the parasitic coils 720, and the primary coils 710 do not overlap the parasitic coils 720. In various embodiments, the primary coils 710 can overlap the parasitic coils 720. In some embodiments, the parasitic coils 720 can overlap each other.

Figure 8:
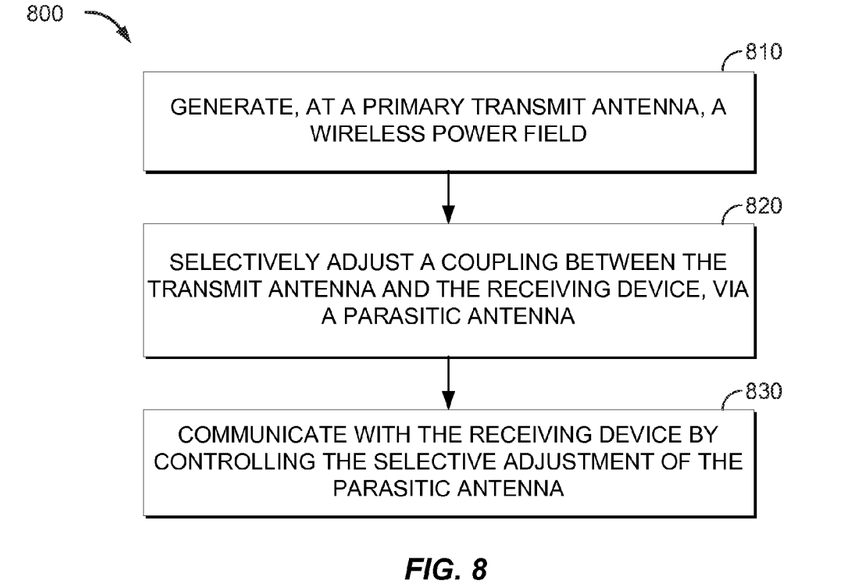
FIG. 8 is a flowchart of an exemplary method of providing wireless power.

FIG. 8 is a flowchart 800 of an exemplary method of providing wireless power. Although the method of flowchart 800 is described herein with reference to the wireless power transmission system 100 discussed above with respect to FIGS. 1-2, the transmitter 404 discussed above with respect to FIG. 4, and the transmit coils 700a-700f discussed above with respect to FIGS. 7A-7F, a person having ordinary skill in the art will appreciate that the method of flowchart 800 may be implemented by another device described herein, or any other suitable device. In an embodiment, the steps in flowchart 800 may be performed by a processor or controller such as, for example, the controller 415 (FIG. 4) and/or the processor-signaling controller 516 (FIG. 5). Although the method of flowchart 800 is described herein with reference to a particular order, in various embodiments, blocks herein may be performed in a different order, or omitted, and additional blocks may be added.

First, at block 810, a wireless charging device provides wireless power to a receiving device by generating a wireless charging field. The wireless charging device can generate the wireless charging field at a primary transmit antenna. For example, the transmitter 404 (FIG. 4) can provide wireless charging power to the receiver 508 (FIG. 5) by generating a wireless charging field at the primary coil 710, as discussed above with respect to FIG. 7. In various embodiments, the primary transmit antenna can provide wireless charging power to one or more receiving devices, for example, in the charging areas 750. In some embodiments, a plurality of primary transmit antennas can provide wireless charging power to one or more receiving devices.

Next, at block 820, a parasitic antenna selectively adjusts a coupling between the transmit antenna and the receiving device. For example, the parasitic coil 720 can adjust the coupling between the primary coil 710 and the receive coil 518 (FIG. 5). In some embodiments, the parasitic antenna can be configured to selectively adjust the coupling by varying a magnetic field strength of the wireless power field with proper reactance of the transmitter.

In some embodiments, the parasitic antenna can include a series switch, such as the switching element 735, and a tuning series capacitor, such as the reactive network 730. In some embodiments, the parasitic antenna can include a variable resistor and/or a variable capacitor. In some embodiments, the parasitic antenna can include a network of a plurality of reactive networks. In some embodiments, the parasitic antenna can include a loop antenna.

In some embodiments, one or more additional parasitic antennas can independently adjust a coupling between the primary transmit antenna and one or more devices. For example, the parasitic coils 720 (FIG. 7F) can adjust a coupling between the primary coil 710 and one or more receive coils 518 (FIG. 5). In some embodiments, each parasitic antenna can correspond to a separate charging area 750 of the wireless charging device.

Then, at block 830, the wireless charging device communicates with the receiving device by controlling the selective adjustment of the parasitic antenna. For example, the controller 415 can selectively open and close the switching element 735 of the parasitic coil 720. Accordingly, the magnetic field strength of the primary coil 720 can be modified (e.g., increased or decreased).

In some embodiments, the controller 415 can communicate with the receiving device by transmitting data to the receiving device. For example, the controller 415 can cause the magnetic field strength of the primary coil 720 to change in a pattern recognizable by the receiving device, such as at the processor-signaling controller 516 (FIG. 5). In some embodiments, the controller 415 can communicate with the receiving device via an in-band forward link. For example, the signaling can use the same baseband frequency as the wireless power signal (e.g., 468.75 KHz, 6.78 MHz, 13.56 MHz. etc.).

Figure 9:
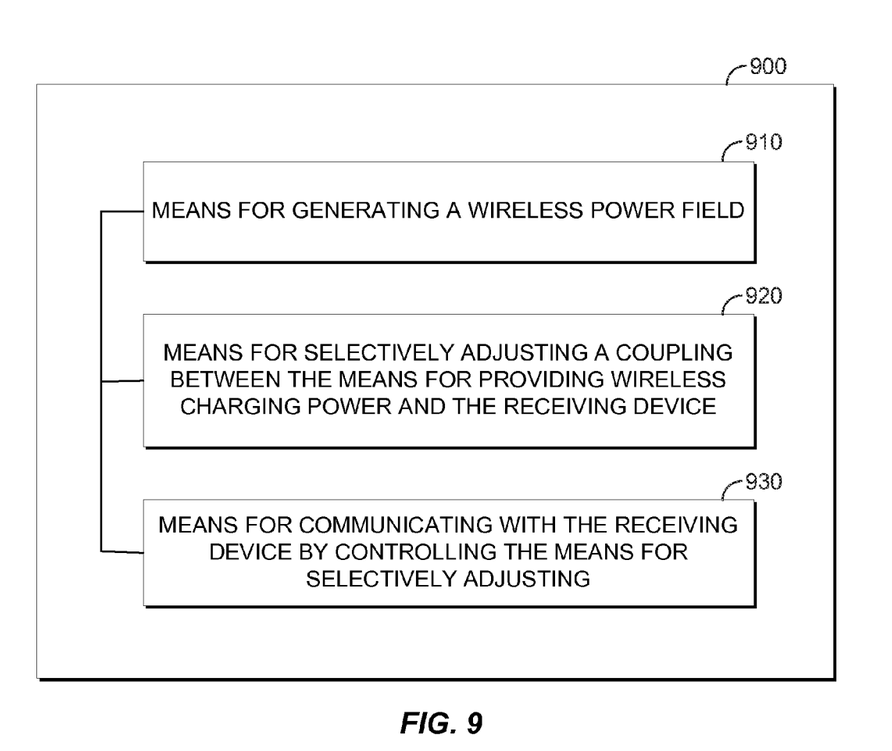
FIG. 9 is a functional block diagram of a system for wireless power transmission, in accordance with an exemplary embodiment of the invention.

FIG. 9 is a functional block diagram of a system 900 for wireless power transmission, in accordance with an exemplary embodiment of the invention. Those skilled in the art will appreciate that the system 900 may have more components than the simplified system described herein. The system 900 described herein includes only those components useful for describing some prominent features of implementations within the scope of the claims. The system 900 for wireless power transmission includes means 910 for generating a wireless power field, means 920 for selectively adjusting a coupling between the means 910 for providing wireless charging power and the receiving device, and means 930 for communicating with the receiving device by controlling the means 920 for selectively adjusting.

In an embodiment, the means 910 for generating the wireless power field can be configured to perform one or more of the functions described above with respect to block 810 (FIG. 8). In various embodiments, the means 910 for generating the wireless power field can be implemented by one or more of the TX coils 214 (FIG. 2), 414 (FIG. 4), 614 (FIG. 6), and 700a-700f (FIGS. 7A-7F), the primary coil 910 (FIGS. 7A-7F), the driver 224 (FIG. 2) and 624 (FIG. 6), and the PA 424 (FIG. 4).

In an embodiment, the means 920 for selectively adjusting a coupling between the means 910 for providing wireless charging power and the receiving device can be configured to perform one or more of the functions described above with respect to block 820 (FIG. 8). In various embodiments, the means 920 for selectively adjusting a coupling between the means 910 for providing wireless charging power and the receiving device can be implemented by one or more of the parasitic coil 720 (FIGS. 7A-7F), the reactive network 730 (FIGS. 7A-7F), and/or the switching element 735 (FIGS. 7A-7F).

In an embodiment, the means 930 for communicating with the receiving device by controlling the means 920 for selectively adjusting can be configured to perform one or more of the functions described above with respect to block 830 (FIG. 8). In various embodiments, the means 930 for communicating with the receiving device by controlling the means 920 for selectively adjusting can be implemented by a processor or controller, such as the controller 415 (FIG. 4).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charging device for providing wireless power to a receiving device, the wireless charging device comprising:
    a primary transmit antenna configured to generate a wireless power field;
    a parasitic antenna configured to adjust a coupling between the primary transmit antenna and the receiving device;
    a switching element electrically coupled to the parasitic antenna and configured to enable or disable the parasitic antenna; and
    a controller configured to control the switching element electrically coupled to the parasitic antenna to adjust the coupling according to a pattern detectable by the receiving device, wherein the controller performs communication with the receiving device by the adjustment of the parasitic antenna.

2. The wireless charging device of claim 1, wherein said parasitic antenna is configured to adjust the coupling by varying a magnetic field strength of the wireless power field.

3. The wireless charging device of claim 1, wherein said parasitic antenna comprises a tuning capacitor and said switching element is electrically coupled in series with the tuning capacitor and the parasitic antenna.

4. The wireless charging device of claim 1, wherein said parasitic antenna comprises a variable resistor and/or a variable capacitor.

5. The wireless charging device of claim 1, wherein said parasitic antenna comprises a network of a plurality of reactive networks.

6. The wireless charging device of claim 1, wherein said parasitic antenna comprises a loop antenna.

7. The wireless charging device of claim 1, wherein said communication with the receiving device comprises transmitting data to the receiving device.

8. The wireless charging device of claim 7, wherein said communication with the receiving device comprises an in-band forward link.

9. The wireless charging device of claim 1, further comprising one or more additional parasitic antennas configured to independently adjust the coupling between the primary transmit antenna and one or more devices.

10. The wireless charging device of claim 9, wherein each parasitic antenna corresponds to a separate charging area of the wireless charging device.

11. A method of providing wireless power in a wireless charging device to a receiving device, comprising:
    generating, at a primary transmit antenna, a wireless power field; and
    controlling a switching element electrically coupled to a parasitic antenna to adjust a coupling between the primary transmit antenna and the receiving device, the coupling adjusted according to a pattern detectable by the receiving device wherein the wireless charging device performs communication with the receiving device by the adjustment of the parasitic antenna.

12. The method of claim 11, wherein said parasitic antenna is configured to adjust the coupling by varying a magnetic field strength of the wireless power field.

13. The method of claim 11, wherein said parasitic antenna comprises a tuning capacitor and said switching element is electrically coupled in series with the tuning capacitor and the parasitic antenna.

14. The method of claim 11, wherein said parasitic antenna comprises a variable resistor and/or a variable capacitor.

15. The method of claim 11, wherein said parasitic antenna comprises a network of a plurality of reactive networks.

16. The method of claim 11, wherein said parasitic antenna comprises a loop antenna.

17. The method of claim 11, further comprising transmitting data to the receiving device.

18. The method of claim 17, wherein said transmitting data to the receiving device comprises signaling the receiving device via an in-band forward link.

19. The method of claim 11, further comprising independently adjusting the coupling between the primary transmit antenna and one or more devices, via one or more additional parasitic antennas.

20. The method of claim 19, wherein each parasitic antenna corresponds to a separate charging area of the wireless charging device.

21. An apparatus for providing wireless power to a receiving device, comprising:
    means for generating a wireless power field;
    means for adjusting a coupling between the generating means and the receiving device, the adjusting means being parasitic to and galvanically isolated from the generating means;
    means for switching electrically coupled to the adjusting means, the switching means configured to enable or disable the adjusting means; and
    means for controlling the switching means electrically coupled to the adjusting means to adjust the coupling between the generating means and the receiving device, the coupling adjusted according to a pattern detectable by the receiving device, wherein the controlling means performs communication with the receiving device by the adjustment of the adjusting means.

22. The apparatus of claim 21, wherein said adjusting means comprises means for varying a magnetic field strength of the wireless power field.

23. The apparatus of claim 21, wherein said adjusting means comprises means for tuning and said switching means is electrically coupled in series with the tuning means and the adjusting means.

24. The apparatus of claim 21, wherein said adjusting means comprises means for varying resistance and/or means for varying capacitance.

25. The apparatus of claim 21, wherein said adjusting means comprises means for modifying reactance.

26. The apparatus of claim 21, wherein said adjusting means comprises a loop antenna.

27. The apparatus of claim 21, further comprising means for transmitting data to the receiving device.

28. The apparatus of claim 27, wherein said transmitting means comprises means for signaling the receiving device via an in-band forward link.

29. The apparatus of claim 21, further comprising means for independently adjusting the coupling between the generating means and one or more devices.

30. The apparatus of claim 29, wherein means for independently adjusting the coupling corresponds to one or more separate charging areas of the apparatus.

31. A non-transitory computer-readable medium comprising code that, when executed, causes an apparatus to:
    generate, at a primary transmit antenna, a wireless power field;
    control a switching element electrically coupled to a parasitic antenna to adjust a coupling between the primary transmit antenna and a receiving device,
    the coupling adjusted according to a pattern detectable by the receiving device, wherein the apparatus performs communication with the receiving device by the adjustment of the parasitic antenna.

32. The medium of claim 31, wherein said parasitic antenna is configured to adjust the coupling by varying a magnetic field strength of the wireless power field.

33. The medium of claim 31, further comprising code that, when executed, causes the apparatus to transmit data to the receiving device.

34. The medium of claim 33, further comprising code that, when executed, causes the apparatus to signal the receiving device via an in-band forward link.

* * * * *